United States Patent [19]

Smith et al.

[11] Patent Number: 4,949,340
[45] Date of Patent: Aug. 14, 1990

[54] REDUNDANT REPEATER

[75] Inventors: Mark L. Smith, Salem, Mass.; Joseph J. Nicosia, Hudson, N.H.; Daniel A. Boudreau, Westford, Mass.; Leo A. Goyette, Salem, N.H.

[73] Assignee: Xyplex, Inc., Boxboro, Mass.

[21] Appl. No.: 222,148

[22] Filed: Jul. 21, 1988

[51] Int. Cl.$^5$ .............................................. G06F 11/20
[52] U.S. Cl. ........................................ 371/8.2; 370/16; 455/9
[58] Field of Search ............... 371/8.2, 20.2, 8.1, 371/11.2; 955/8, 9, 601; 379/4; 375/3.1, 4; 370/16

[56] References Cited

U.S. PATENT DOCUMENTS

| | | | |
|---|---|---|---|
| 2,597,043 | 5/1952 | Treadwell | 455/8 |
| 4,039,947 | 8/1977 | Miedema | 455/8 |
| 4,406,513 | 9/1983 | Raphael | 455/601 X |
| 4,581,770 | 4/1986 | Haworth | 455/607 X |
| 4,704,713 | 11/1987 | Haller | 455/601 X |
| 4,727,592 | 2/1988 | Okada | 455/601 |

Primary Examiner—Allen MacDonald
Assistant Examiner—Robert W. Beausoliel
Attorney, Agent, or Firm—Fish & Richardson

[57] ABSTRACT

A redundant repeater connected between two transmission mediums that can operate in a repeat state where packets are repeated between the mediums, and a standby state where no packets are repeated and where the repeater determines whether packets are being properly repeated between the transmission mediums by another device. If the repeater determines that packets are being independently repeated it remains in the standby state, and will attempt to leave the standby state and return to the repeat state only if it determines that packets on one medium are not being repeated to the second medium. Two repeaters can be redundantly connected across the same transmission mediums with one operating in repeat state and the other in standby. If one repeater fails, the other will begin repeating all received packets. The repeater determines whether packets are being properly repeated by detecting overlapping or non-overlapping packets between its two transmission mediums.

30 Claims, 6 Drawing Sheets

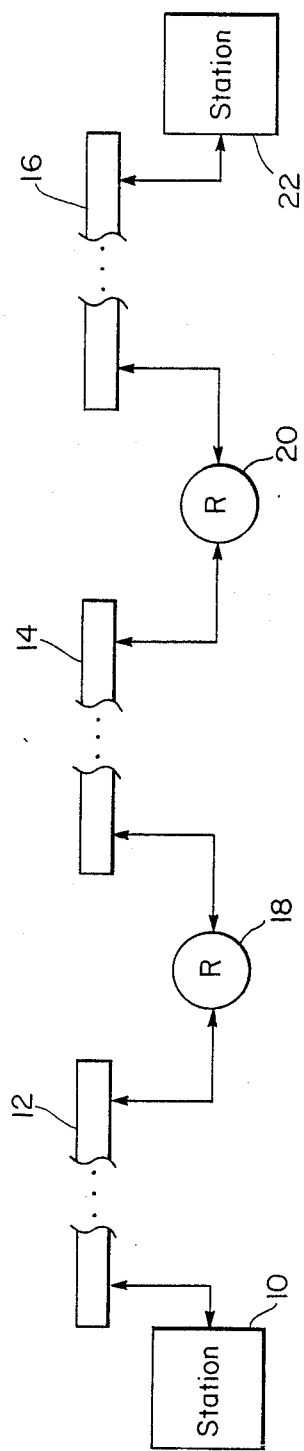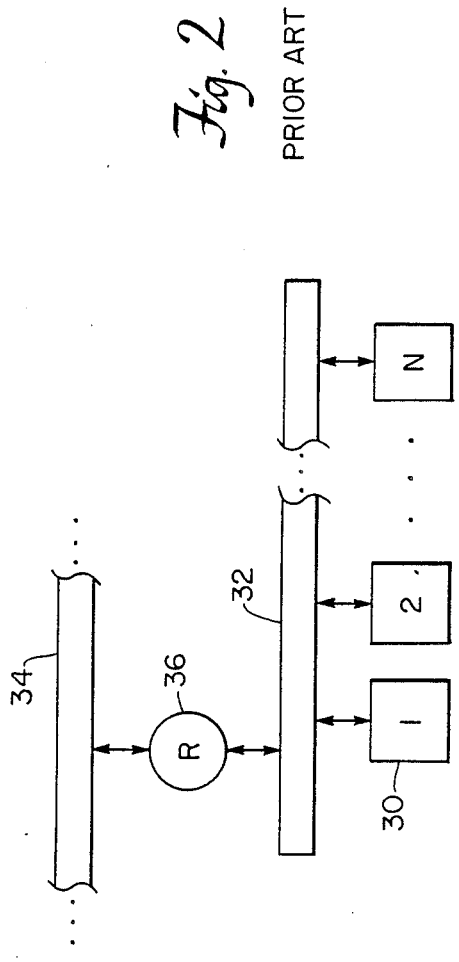
Fig. 1 PRIOR ART
Fig. 2 PRIOR ART

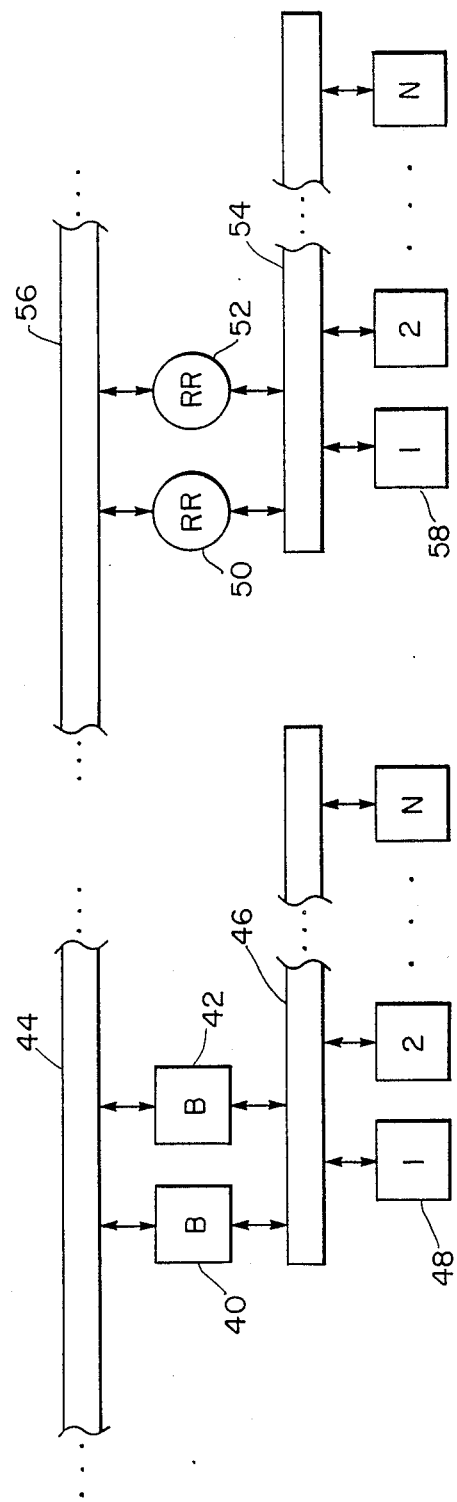

REDUNDANT REPEATER

BACKGROUND OF THE INVENTION

This invention relates to repeaters used to transmit information from one transmission medium to another transmission medium.

Repeaters are widely used in the transmission of information throughout a system, and are particularly useful in the transmission of information throughout a local area network (LAN). For example, repeaters are used to connect coaxial cable segments together to form a longer transmission medium since there are strict limits on the allowable length of any one segment. FIG. 1 shows a station 10, being connected to a station 22 through three cable segments 12, 14, 16 and two repeaters 18, 20. According to IEEE 802.3 standards for LANS, a segment may not be longer than 500 meters. Therefore repeaters 18, 20 in FIG. 1 are used to connect stations up to 1,500 meters apart.

FIG. 2 illustrates the connection of a plurality of stations to a LAN cable segment. Each of stations 30 (numbered 1 to N) is connected to segment 32 which is connected to LAN segment 34 through repeater 36. Therefore, repeater 36 provides access for each station 30 to the LAN segment 34.

A repeater transmits information by receiving the information on one cable segment and repeating the received information onto the other cable segment to which it is attached. The repeater may perform a variety of signal processing operations on the received data before it is repeated, such as signal amplification, signal retiming, preamble insertion, etc.

Since each of stations 30 utilize the same medium to transmit information (i.e., segments 32 and 34), only one station can be transmitting information at a given time. Accordingly, before a station transmits information to a segment it will "listen" to the segment to determine if the segment is "available". The station will transmit information only to a segment which is available. Nevertheless, a "collision" may still occur since it is possible that both will test the desired cable segment simultaneously and, since both would hear a quiet cable segment, both may simultaneously begin transmitting data. Repeaters automatically repeat whatever data they receive, and, therefore, a collision on one segment will quickly spread to the entire network. Therefore, stations are able to detect such collisions. When collisions occur, a station will typically wait a predetermined period of time and again attempt transmission.

The reliability of the operation of a LAN depends a great deal on the reliability of the repeaters in the system. For example, in the system of FIG. 1, if one repeater fails, communication between station 10 and station 22 will be impossible. In a more elaborate network, using more repeaters, the likelihood that one will fail and therefore the likelihood that the system will fail, increases. In a system such as the one illustrated in FIG. 2, the failure of repeater 36 will terminate all communication between each station 30 and LAN segment 34. When such a failure occurs, the time required to isolate and replace the failed repeater can be significant.

In order to provide a more secure sytem, i.e., one that won't fail with the failure of a single repeater, bridges were developed to connect transmission mediums. A typical system utilizing bridges instead of repeaters is illustrated in FIG. 3. Bridges 40, 42 connect cable segments 44, 46 to enable stations 48 (numbered 1 to N) to communicate with stations (not shown) on LAN segment 44.

Bridges 40, 42 are capable of receiving information on either of the cable segments and transmitting the information to the other segment (much like a repeater). Information is transmitted in packets of a fixed duration and, for example, a packet transmitted on segment 46 by one of stations 48 will be received by each of bridges 40, 42. It can be clearly seen that if bridges 40, 42 acted like standard repeaters (or, if standard repeaters were connected in a manner similar to the parallel connection of bridges 40, 42), each would attempt to transmit the received packet onto cable segment 44, resulting in a collision. This would happen every time information was received over either segment 46 or segment 44, rendering the system inoperable.

However, bridges 40, 42 are software controlled devices (unlike hardware controlled repeaters) which commuicate with one another before tranmsitting received infomation. When a packet is received by the bridges, one of the bridges (designated in advance) will "tell" the other bridge not to transmit the received packet and will then proceed to transmit the packet itself, thereby avoiding a collision. Bridges also "act" like stations in that they will listen to a segment before transmitting to be sure that it is available.

If one of the bridges should fail the other can assume all of the packet transmission functions until the failed bridge is replaced. This will allow the system to continue to operate in the event of a failure and each of the stations will continue to have access to the LAN.

Bridges may be similarly used in a system such as that illustrated in FIG. 1 and can prevent a break in the system due to failure.

SUMMARY OF THE INVENTION

The invention generally features an apparatus for repeating information between a plurality of transmission mediums in, for example, a local area network and includes at least two repeaters, each of which is connected between two of the transmission mediums, with at least one of the repeaters repeating information only if it determines that information is not being independently transmitted between its respective transmission mediums.

The invention also generally features a repeater that operates in at least two distinct states: the repeat state, and the standby state. When in the repeat state, the repeater repeats all information that it receives over one transmission medium to its other transmission medium and when in the standby state, the repeater repeats no information, and detects whether or not information is being independently repeated between its two respective mediums. The repeater remains in the standby state until it determines that information is not being repeated between its two mediums and enters the repeat state at that time.

In the preferred embodiment of the invention, the repeater determines whether information is being transmitted between its two mediums by detecting the presence of overlapping packets of information on the mediums, the presence of such information indicating that information is being properly repeated. The detection of non-overlapping information indicates that information is not being repeated. The repeater will remain in the standby state when overlapping packets are detected and will leave standby and return to repeat when non-overlapping packets are detected. When in the repeat state the repeater will switch to standby if a predetermined number of collisions are encountered when transmitting data, and will return to repeat via a fault state if non-overlapping packets are detected.

When in the fault state, the repeater will send information only to the side on which collisions were detected until information is sent without collision. The repeater will return to standby from fault if a predetermined number of collisions are encountered and will return to repeat from fault if one packet is sent successfully.

The repeater of the present invention is unique in that two repeaters may be connected in parallel across the same two cable segments (i.e., a redundant repeater may be used). When two repeaters of the invention are connected in this redundant fashion, one will enter the active state and the other will enter the standby state. As long as the active repeater remains active, the standby repeater will not repeat any information it receives thereby avoiding collisions. However, if the active repeater should fail, the standby (or redundant) repeater will detect non-overlapping packets and will automatically become active and take over all transmission functions.

The repeater of the invention is a considerable improvement over prior art repeaters and bridges. As noted above, the failure of a repeater in a prior art repeater system will cause part or all of the system to fail. Bridges provide a much more secure system. However, since bridges are software controlled devices they are considerably more expensive than repeaters. A typical bridge can cost five times more than a repeater. Since two bridges are used to replace each repeater, and since a typical system will use several repeaters, the cost of using bridges can outweigh the advantages of increased reliability. Furthermore, bridges are much slower than repeaters. A repeater will be in transmitting a received packet very quickly and well before the entire packet has been received. On the other hand, a bridge must first receive the entire packet, perform the necessary communications with the other bridge, and then begin transmission. In a system that uses many bridges, this time delay can be prohibitive.

The repeater of the invention combines the advantages of standard repeaters (e.g., low cost and high speed) with the advantages of bridges (e.g., high reliability). Other advantages will become apparent from the following detailed description of the preferred embodiment, and from the claims.

DETAILED DESCRIPTION OF THE PREFERRED EMBODIMENT DRAWINGS

We first briefly describe the drawings.

FIGS. 1 and 2 are block diagrams of prior art systems using standard repeaters.

FIG. 3 is a block diagram of a prior art system using bridges in place of repeaters.

FIG. 4 is a block diagram of a system utilizing repeaters in accordance with the present invention.

Structure

Figure 5:
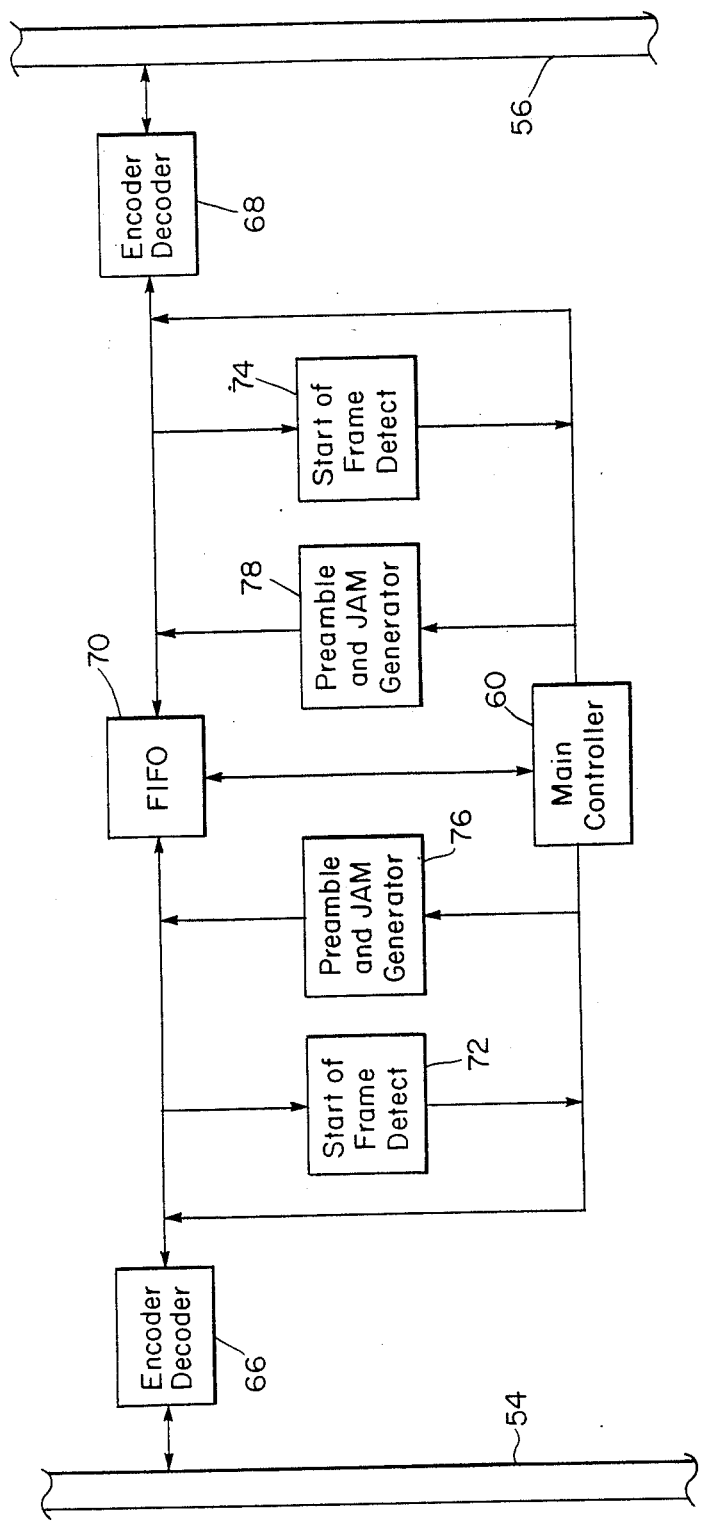
FIG. 5 is a more detailed diagram of one of the repeaters illustrated in FIG. 4.

Referring to FIG. 4, repeaters 50, 52 are used to connect cable segment 54 to cable segment 56 thereby establishing a communication path for a plurality of stations 58 (numbered 1 to N).

FIG. 5 illustrates one of repeaters 50, 52 in greater detail and comprises main controller 60 that controls the transmission of data between cable segments 54, 56. Encoder/decoders 66, 68 are connected directly to segments 54, 56, respectively and to a first in first out (FIFO) register 70. The system includes start of frame detectors 72, 74 and preamble and jam generators 76, 78.

Figure 8:
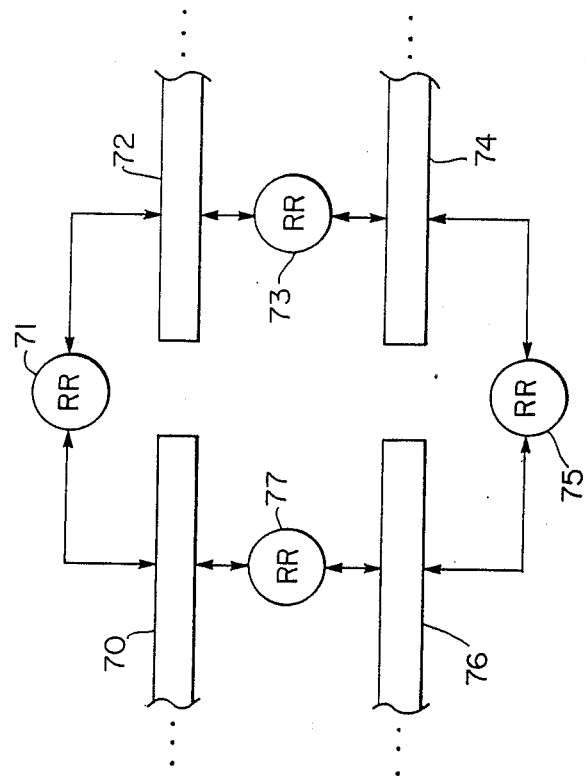
FIG. 8 is a second embodiment of a system utilizing repeaters in accordance with the invention.

Referring to FIG. 8, repeaters 71, 73, 75 and 77 are used to connect segments 70, 72, 74, and 76 in a ring configuration.

Operation

Figure 6:
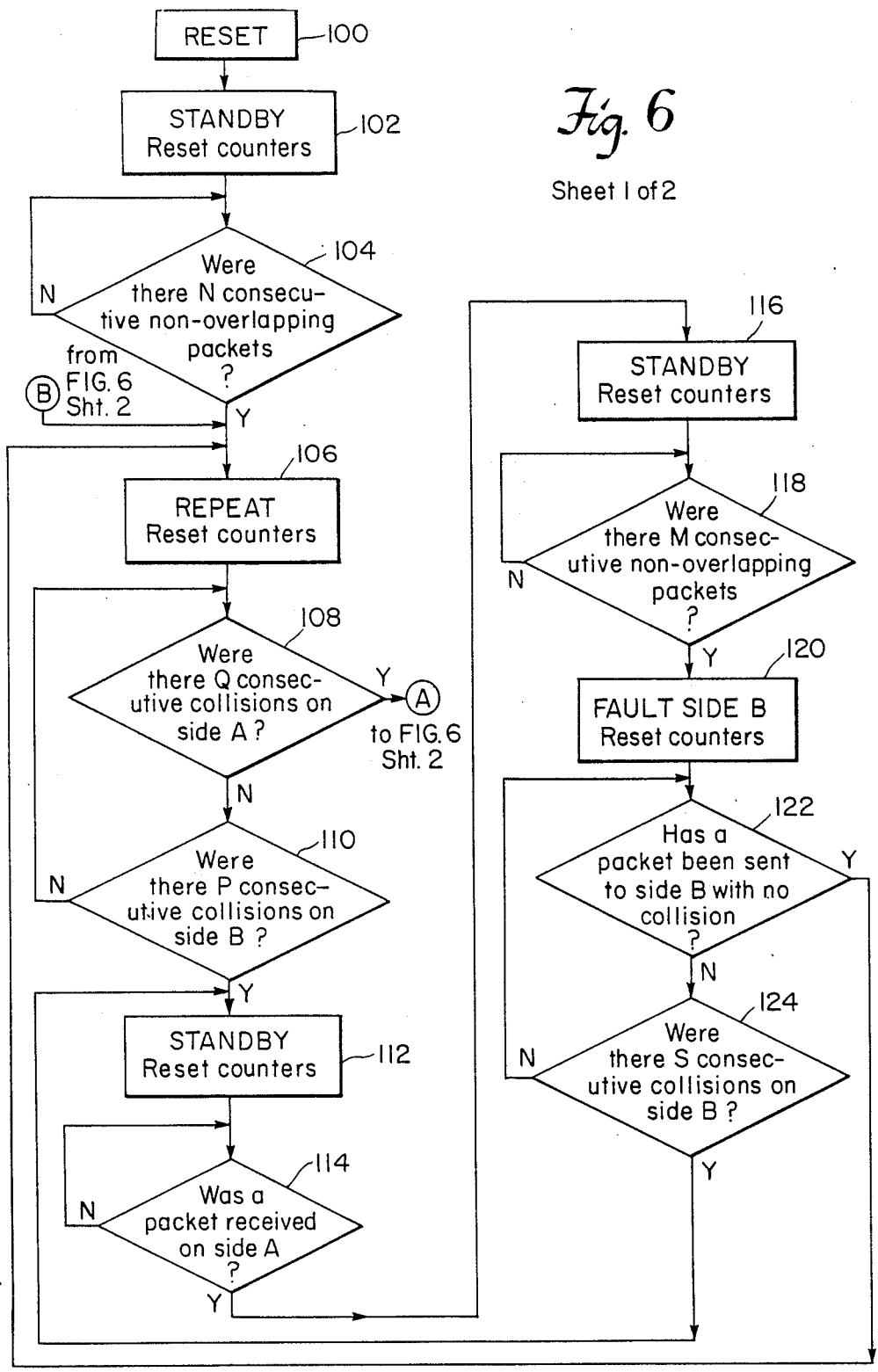
FIG. 6 is a flow chart illustrating the operation of the repeater of the present invention.
Figure 6:
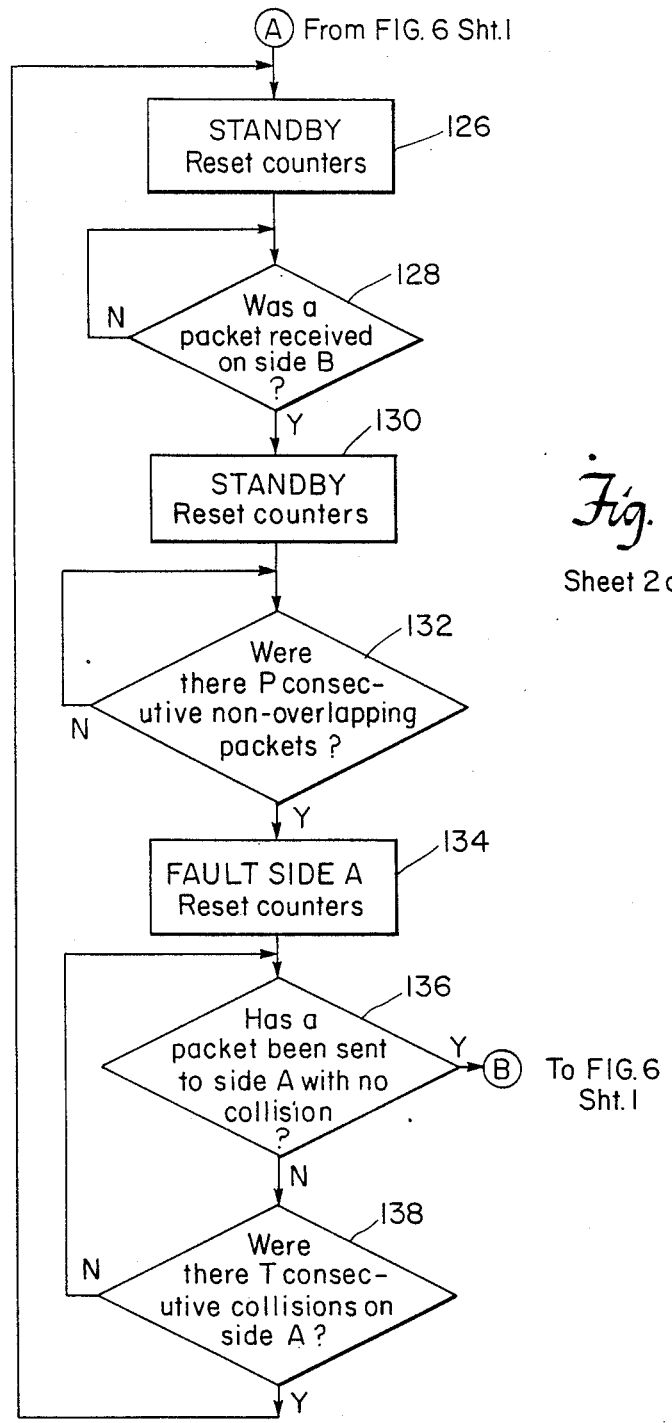

The operation of a repeater connected between two cable segments in accordance with the present invention is illustrated by the flowchart of FIG. 6. During operation the repeater is essentially always within one of three states: the repeat state; the standby state; or the fault state. The repeater is briefly in a reset state when first turned on or when deliberately reset, but quickly moves to standby.

When first turned on, or when reset by an operator (box 100) the repeater moves to the standby state (box 102) and proceeds to monitor each of the two segments to which it is connected (referred to as "side A" and "side B") to detect the presence of "non-overlapping packets" of information (decision box 104). This is the repeater's method for detecting whether or not information is being independently repeated (e.g., by another repeater or repeaters) between side A and side B, and is accomplished due to the unique relationship between packets on two cable segments in a properly operating system.

Figure 7:
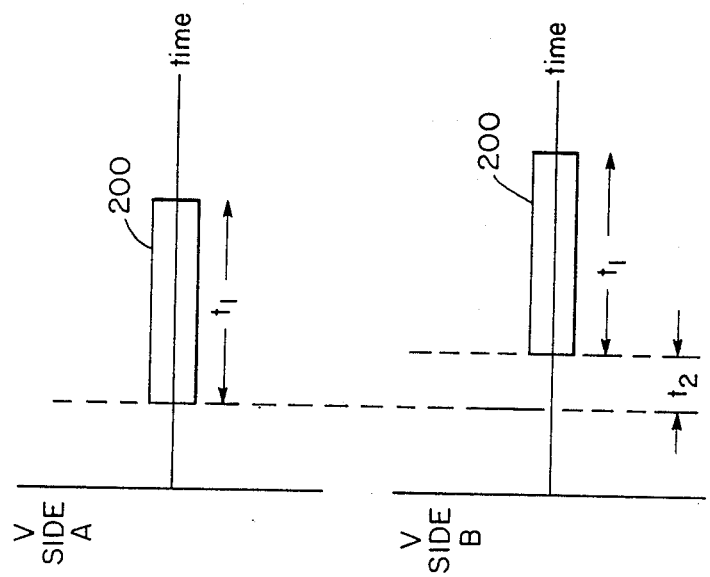
FIG. 7 is a diagram illustrating the transmission of information on two cable segments.

FIG. 7 illustrates this relationship, and depicts plots of the voltage on side A and side B when a packet is transmitted from side A to side B, versus time. The packets shown in FIG. 7 are illustrated by rectangular shaped voltage variations on the appropriate segment. The actual signal is basically a digital signal. However, for purposes of this discussion, the waveform is not important. The packets shown in the figure illustrate their time relationship.

A packet 200 of length $t_1$, is transmitted on side A (e.g., by a station) and is received by a repeater and then transmitted on side B, with a delay $t_2$ caused by the time required for the repeater to receive, process and begin transmitting the packet. Since $t_1 > t_2$ for all possible transmissions (according to IEEE standards), the packets will always "overlap" each other. In other words, for every packet that is transmitted, the packet will simultaneously appear on both segments for a time equal to $t_1 - t_2$. Therefore, if in the standby state a repeater "sees" overlapping packets of information, it will know that information is being properly repeated between the two segments and that, therefore, it should not enter the repeat state. Accordingly, if overlapping packets appear between side A and side B, the repeater will not see the required number (i.e., "N") of non-overlapping packets, and will, therefore, remain in the standby state.

If, however, packets are not being properly repeated between side A and side B, the repeater in standby will see non-overlapping packets. Referring again to FIG. 7, a packet 200 transmitted on side A would not have an overlapping packet on side B if there was no functioning repeater between the two segments. Once the repeater in standby has seen a predetermined number of such non-overlapping packets (i.e., N consecutive non-overlapping packets) it will conclude that packets are not being properly repeated and will pass to the repeat state (box 106 in FIG. 6).

In the repeat state, the repeater will repeat packets received at either segment to the other segment and will remain in this state unless collisions are encountered. If the repeater detects a predetermined number of collisions on either side A (decision box 108) or side B (decision box 110) the repeater will cease repeating received packets and will return to the standby state (boxes 112 and 126).

First, the situation in which a predetermined number of collisions are detected on side B will be discussed. The repeater will enter the standby state represented by box 112 and will cease all transmissions. Before testing for non-overlapping packets (as was done in decision box 104 above) the repeater waits until one packet is received on side A (the non-collision side) (decision box 114). The reason for this step will be explained below.

Once a packet is received on side A the repeater, still in the standby state (box 116), tests for the presence of an operating repeater by attempting to detect non-overlapping packets (decision box 118). As described above, if non-overlapping packets cannot be detected, then packets are being properly repeated between side A and side B and the repeater will stay in the standby state.

If non-overlapping packets are detected in step 118 (indicating that packets are not being properly repeated) the repeater leaves the standby state and enters the fault state (box 120). In the fault state, the repeater will attempt to send a packet to the fault side (side B in this example). If a packet is successfully sent, then the repeater returns to the repeat state (decision box 122) and will resume normal repeat operations. However, if a collision is again encountered the repeater will remain in the fault state and will continue to attempt to transmit a packet to the faulted side. After a predetermined number of attempts at transmitting a packet, the repeater will leave the fault state and return to standby (decision box 124).

The repeater, after reentering standby (box 112), waits until one packet is transmitted on side A (box 114). This step is necessary since it is possible that the original collisions that sent the repeater from the repeat state to the standby state (i.e., box 110) were caused by another (i.e., redundant) repeater. If this was the case, the two repeaters may both be in the fault state at the same time. Therefore, both repeaters will be trying to leave the fault state by transmitting a packet to side B, thereby causing more collisions, and yielding "no" results in box 122. Accordingly, the repeater will occasionally leave the fault state and let one packet arrive on side A to give another repeater a chance to return to the repeat state. In other words, if two repeaters are both in fault, each will occasionally go to standby and let one packet arrive thereby giving the other repeater a chance to receive the packet, transmit it successfully (box 122) and return to repeat (box 106). For two repeaters connected redundantly together all of the constants, such as constant S, will be different so that the two repeaters should not both leave the fault state at the same time. The relationship between these constants is discussed more fully below.

Once the repeater has allowed a packet to be received on side A (thereby allowing a possible competing repeater to return to the repeat state), it will remain in the standby state (box 116) and check once again for non-overlapping packets. If the fault was originally caused by a redundant repeater, and that repeater has returned to the repeat state, the standby repeater will now see overlapping packets and remain in standby. If it sees the predetermined number of non-overlapping packets it will once again enter the fault state and attempt to return to the repeat state by trying once again to send a packet successfully to side B.

To summarize, a repeater operating in the repeat state (box 106) that encounters a predetermined number of collisions in its attempts to repeat packets to side B will stop repeating any information and enter the standby state (boxes 112, 116). Before making further attempts at repeating, the repeater checks to see if packets are already being properly repeated between the two segments (decision box 118). Only if it determines that packets are not being properly repeated (i.e., by seeing non-overlapping packets) does it try to send a packet to the faulted side (side B). If the repeater successfully sends a packet to the faulted side it returns to repeat (boxes 122, 106). After a predetermined number of attempts at sending a packet to side B, the repeater returns to standby in order to: (1) allow a competing repeater the opportunity to send a packet to side B without collisions (box 114); and (2) check and see if packets are being sent properly (box 118).

The process followed for collisions detected on side A (box 108) is analagous and the repeater will follow the steps illustrated in boxes 126, 128, 130, 132, 134, 136 and 138. Of course, since side A is the "fault side," the repeater will attempt to return to the repeat state by sending a packet to side A and will, at step 128, wait for a packet to be received on side B.

Referring to FIG. 5, this process is implemented by main controller 60. Controller 60 comprises state machines that control the transition to the various states (i.e., repeat, fault, and standby) in accordance with the repeater operation described above. Encoder/decoders 66, 68 receive information from cable segments 54, 56 respectively and decode the received data to form digital packets of information. If the repeater is in the repeat state, the data is transmitted from, e.g., encoder/decoder 66 to FIFO 70, and then to encoder/decoder 68 and finally onto cable segment 56. Start of frame detector 72 informs controller 60 when a new packet is received on cable segment 54, enabling controller 60 to control the transmission of the packet onto cable segment 56. Preamble and jam generator 78 provides standard preamble data and jam signals for transmission onto cable segment 56. Packets received on cable segment 56 are similarly processed and transmitted using start of frame detector 74 and preamble and jam generator 76.

If the repeater is in the standby state, controller 60 simply does not transmit packets received on either cable segment but watches for non-overlapping packets as discussed above. Similarly, when in fault state, transmission occurs only to the faulted cable segment.

When two identical repeaters that operate according to the flowchart of FIG. 6 are connected redundantly in a system, one will operate in the repeat state and the other, seeing overlapping packets, will remain in standby. If both repeaters somehow enter the standby state (e.g., by collisions on a cable, or by both being reset simultaneously) the conflict will be quickly resolved and one repeater will return to repeat while the other stays in standby. Thereafter, if the repeater in the repeat state should malfunction, the standby repeater will immediately see non-overlapping packets and enter the repeat state.

In order to ensure that conflicts between two redundantly connected repeaters are properly (and quickly) resolved, it is essential that the constants used to control each repeater's progress through the steps of FIG. 6 be different so that the two repeaters don't "follow each other" through the steps preventing one of them from returning to repeat. In other words, if the constants were the same, both repeaters could enter the standby state and then the fault state simultaneously and, since both repeaters would be repeating packets to the failed side to try and return to the repeat state (which requires a successful transmission to the failed side), collisions would result and neither would be able to leave the fault state. Both repeaters would return to standby from fault simultaneously (i.e., since "s" or "t" would be the same for both repeaters) and the repeaters would stay in this loop indefinitely. However, if all constants are different for redundantly connected repeaters, they cannot both travel through the loop together. Therefore, if two repeaters were both in the fault state, one would enter the standby state first (after reaching its "s" or "t" value) allowing the other repeater to successfully repeat a packet to the failed side thereby returning to the repeat state. The other repeater would then see overlapping packets and remain in standby.

Similarly, if two redundantly connected repeaters are reset (e.g., by being turned on) simultaneously, they would both enter standby (box 102 in FIG. 6) and begin counting non-overlapping packets. If constant "N" were the same for the two repeaters, they would both enter repeat together and start repeating at the same time causing collisions. However, if they have different values of N, then one repeater would enter the repeat state first and begin repeating. The second repeater would now see overlapping packets and would therefore not reach its value of N, and would therefore remain in standby.

In order to avoid problems such as these and to ensure proper operation of the repeaters, the following conditions should be satisfied. For any given repeater, the constants Q, R, S and T should be different. The constants M, N and P may be equal to each other but may not be equal to Q, R, S or T. For two repeaters connected to the same segment, no single constant (M—T) on one repeater can equal the corresponding constant on the other repeater. If these conditions are met, the repeaters will never both remain in the standby or fault states. One repeater will always be able to return to the repeat state and reconnect the system. The other repeater will remain in standby until a failure occurs. It should be noted that it is not necessary to meet all of these conditions for proper operation of the repeaters. These conditions are optimal in order to resolve conflicts as quickly as possible.

The repeater of the present invention may be advantageously utilized in many various applications, in addition to the simple redundant connection shown in FIG. 4. For example, FIG. 8 illustrates a "ring network." The network comprises four cable segments, 70, 72, 74 and 76. Four repeaters, 71, 73, 75 and 77, are used to connect the segments in a ring-shaped path. Each cable segment may include one or more stations (not shown).

During normal operation of the ring network, three of the repeaters will be in the repeat state and the fourth will be in standby. All of the repeaters cannot be in the repeat state since collisions would occur. For example, assume that all repeaters are repeating, and a packet is transmitted onto segment 70 (e.g., by a station.) Repeaters 71 and 77 would receive the packet and each would repeat it, resulting in the packet being transmitted on segments 72 and 76. Repeaters 73 and 75 would then each receive the packet and both would try to transmit it onto segment 74, resulting in a collision.

Now, assume that repeater 71 is in standby and the other repeaters are in repeat. A packet transmitted on segment 70 would be repeated to segment 76 by repeater 77. Repeater 75 would repeat the packet to segment 74 and repeater 73 would repeat the packet to segment 72. The packet has now been received by each segment without collision.

If four repeaters of the present invention are connected in the arrangement of FIG. 8, three of the repeaters would always "settle" into the repeat state with the fourth remaining in standby. Which of the repeaters would be in standby would depend on the assigned values of the constants and on exactly when each of the repeaters is turned on and where the packets originate. As long as the rules regarding the values of the constants outlined above are followed, the network will always settle into a stable state with one repeater in standby.

The advantages of such a network are significant. If any one of the three active repeaters becomes inoperative, the standby repeater will automatically enter the repeat state and the network will continue to function properly.

Other embodiments of the invention are within the scope of the appended claims.

We claim:

1. An apparatus for repeating information between a plurality of transmission mediums, said apparatus comprising:

a repeater connected between two of said transmission mediums for repeating information received on one transmission medium to its other transmission medium; and a second repeater connected between two of said transmission mediums for repeating information received on one transmission medium to its other transmission medium, wherein at least one of said repeaters detects whether information is being independently repeated between its respective transmission mediums and does not repeat any information if information is being so repeated, said one repeater repeating information if information is not being so repeated.

2. The apparatus of claim 1 wherein said one repeater detects whether information is being repeated by detecting the presence of overlapping information on two of said transmission mediums.

3. The apparatus of claim 2 wherein said information comprises one or more packets of information, and wherein said one repeater detects the presence of overlapping packets on two of said transmission mediums.

4. The apparatus of claim 1 wherein said one repeater determines that information is not being repeated by detecting non-overlapping information on two of said transmission mediums.

5. The apparatus of claim 4 wherein said information comprises one or more packets of information, and wherein said one repeater detects non-overlapping packets on two of said transmission mediums.

6. The apparatus of claim 1 wherein said first repeater and said second repeater are both connected to the same two transmission mediums.

7. The apparatus of claim 6 wherein one of said repeaters repeats information and the other of said repeaters does not repeat information.

8. The apparatus of claim 1 wherein said first and second repeaters both detect whether information is being repeated between their respective mediums.

9. The apparatus of claim 1 wherein said transmission mediums are part of a local area network.

10. The apparatus of claim 1 where said transmission mediums are coaxial cables.

11. The apparatus of claim 1 wherein either said first repeater or said second repeater will stop repeating information if a predetermined number of collisions occur on one of said transmission mediums to which the respective repeater is connected.

12. A repeater connected between two transmission mediums for repeating information received on one transmission medium to its other transmission medium, said repeater operating in either a standby state or a repeat state,
wherein when operating in said repeat state said repeater repeats information received on one transmission medium to its other transmission medium, and
wherein when operating in said standby state said repeater does not repeat information, said repeater remaining in said standby state until said repeater determines that information is not being repeated between said transmission mediums.

13. The repeater of claim 12 wherein said repeater determines that information is not being repeated between said transmission mediums by detecting a predetermined amount of non-overlapping information.

14. The repeater of claim 13 wherein said repeater enters said repeat state from said standby state when said predetermined amount of non-overlapping information is detected.

15. The repeater of claim 13 wherein said repeater switches from said standby state to a fault state when said predetermined amount of non-overlapping information is detected, said repeater repeating information to said one of said transmission mediums on which said predetermined number of collisions were detected until information is sent without collision, said repeater then returning to said repeat state.

16. The repeater of claim 15 wherein when said repeater is in said fault state, said repeater does not repeat information received from said one of said transmission mediums on which collisions were detected.

17. The repeater of claim 15 wherein said repeater will leave said fault state and return to said standby state after a predetermined number of unsuccessful attempts at repeating information.

18. The repeater of claim 17 wherein said repeater will return to said fault state after determining that information has been transmitted on a transmission medium other than the transmission medium on which collisions were detected.

19. The repeater of claim 13 wherein said information comprises packets of information and wherein said predetermined amount is a predetermined number of packets of information.

20. The repeater of claim 12 wherein said repeater switches from said repeat state to said standby state if a predetermined number of collisions occur on one of said transmission mediums.

21. The repeater of claim 12 wherein said transmission mediums are part of a local area network.

22. The repeater of claim 21 wherein said transmission mediums comprise coaxial cables.

23. A method for repeating information between two transmission mediums comprising the steps of:
determining whether information on one of said transmission mediums is being repeated to the other of said transmission mediums by detecting overlapping information between said two transmission mediums;
repeating information received on one of said transmission mediums to the other of said transmission mediums if the result of said determining step is negative; and
not repeating any information to either of said transmission mediums if the result of said determining step is positive.

24. The method of claim 23 wherein said step of determining comprises detecting overlapping information between said two transmission mediums.

25. The method of claim 24 wherein said information comprises one or more packets of information and wherein said step of determining comprises detecting at least one overlapping packet of information.

26. The method of claim 24 wherein the result of said determining step is positive if said overlapping information is detected.

27. The method of claim 23 wherein said step of determining comprises detecting non-overlapping information between said two transmission mediums.

28. The method of claim 27 wherein said information comprises one or more packets of information and wherein said step of determining comprises detecting at least one non-overlapping packet of information.

29. The method of claim 27 wherein the result of said determining step is negative if said non-overlapping information is detected.

30. The method of claim 23 wherein said transmission mediums are part of a local area network.

* * * * *